(12) United States Patent
Yuill

(10) Patent No.: US 10,471,361 B2
(45) Date of Patent: Nov. 12, 2019

(54) VIDEO SHARING METHOD

(71) Applicant: Popbox Ltd., Bristol (GB)

(72) Inventor: Calum Yuill, Bristol (GB)

(73) Assignee: POPBOX LTD., Bristol (GB)

( * ) Notice: Subject to any disclaimer, the term of this patent is extended or adjusted under 35 U.S.C. 154(b) by 0 days.

(21) Appl. No.: 15/556,802

(22) PCT Filed: Mar. 24, 2016

(86) PCT No.: PCT/EP2016/000510
§ 371 (c)(1),
(2) Date: Sep. 8, 2017

(87) PCT Pub. No.: WO2016/155875
PCT Pub. Date: Oct. 6, 2016

(65) Prior Publication Data
US 2018/0272237 A1 Sep. 27, 2018

(30) Foreign Application Priority Data
Mar. 27, 2015 (GB) .................................. 1505271.5

(51) Int. Cl.
| A63F 13/00 | (2014.01) |
| A63F 13/86 | (2014.01) |
| A63F 13/85 | (2014.01) |
| A63F 13/49 | (2014.01) |
| A63F 13/30 | (2014.01) |
| A63F 13/87 | (2014.01) |
| H04N 21/2187 | (2011.01) |
| H04N 21/478 | (2011.01) |

(52) U.S. Cl.
CPC .............. *A63F 13/86* (2014.09); *A63F 13/30* (2014.09); *A63F 13/49* (2014.09); *A63F 13/85* (2014.09); *A63F 13/87* (2014.09); *H04N 21/2187* (2013.01); *H04N 21/4781* (2013.01)

(58) Field of Classification Search
None
See application file for complete search history.

(56) References Cited

U.S. PATENT DOCUMENTS

2007/0243936 A1* 10/2007 Binenstock ............ G06Q 30/02
463/42
2008/0139301 A1 6/2008 Holthe
(Continued)

OTHER PUBLICATIONS

International Search Report and Written Opinion for PCT/EP2016/000510 dated Sep. 28, 2016, 8 pages.

*Primary Examiner* — Paul A D'Agostino
(74) *Attorney, Agent, or Firm* — Fay Sharpe LLP

(57) ABSTRACT

The invention relates to a method of sharing a live video with at least two computers on a network. The method comprises: Determining, by a sharing system, the identity of each player in a set of at least two players, of at least one game between the at least two players; associating at least one first player with at least one second player; and receiving, of a video file, by one or more of the at least two computers sent by the at least one first player using one of the at least two computers. The video file includes a performance of a first player, permitting the performance of the first player to be judged by the other at least one second players or more players in the set.

24 Claims, 20 Drawing Sheets

POPBOX network infrastructure

1. The client device is the user's mobile phone, tablet, laptop, or desktop computer.
2. Identity provider services are used to verify the user's identity.
3. The API server is the client device's main point of contact with the POPBOX network.
4. The user database stores information pertaining to POPBOX users.
5. The game server cluster is a distributed network of cloud-based servers, each of which is responsible for hosting a large number of real-time multiplayer games.
6. The game database stores archived information about archived games.
7. The media server cluster is a distributed network of cloud-based servers, each of which is responsible for maintaining a database of archived media (such as video performances).
8. Notification services are used to deliver out-of-game alerts to users.

(56) References Cited

U.S. PATENT DOCUMENTS

| | | | |
|---|---|---|---|
| 2008/0268961 A1* | 10/2008 | Brook | A63F 13/12 |
| | | | 463/42 |
| 2010/0167809 A1 | 7/2010 | Perlman et al. | |
| 2013/0086615 A1* | 4/2013 | Williams | H04N 21/41407 |
| | | | 725/62 |
| 2014/0025799 A1* | 1/2014 | Azizi | H04L 41/00 |
| | | | 709/223 |
| 2014/0070946 A1* | 3/2014 | Ambrefe, Jr. | H04W 4/02 |
| | | | 340/541 |
| 2014/0155154 A1 | 6/2014 | Laakkonen et al. | |
| 2014/0287827 A1* | 9/2014 | Chan | A63F 13/12 |
| | | | 463/29 |
| 2015/0341397 A1* | 11/2015 | Semturs | G06Q 50/01 |
| | | | 715/753 |
| 2016/0150009 A1* | 5/2016 | LeRoy | H04L 67/1095 |
| | | | 709/206 |
| 2016/0219094 A1* | 7/2016 | Ye | H04L 67/02 |
| 2016/0316272 A1* | 10/2016 | Li | H04N 21/4424 |

* cited by examiner

Fig. 1: POPBOX network infrastructure

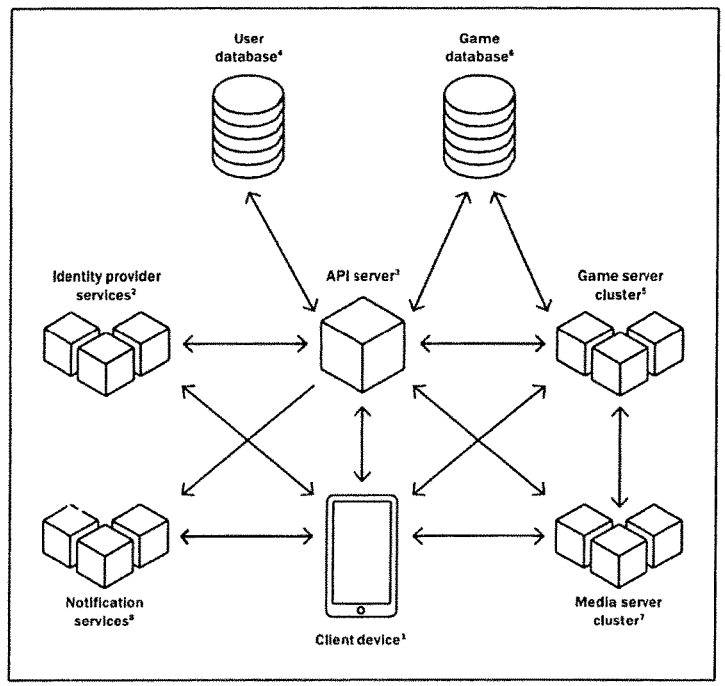

1. The client device is the user's mobile phone, tablet, laptop, or desktop computer.
2. Identity provider services are used to verify the user's identity.
3. The API server is the client device's main point of contact with the POPBOX network.
4. The user database stores information pertaining to POPBOX users.
5. The game server cluster is a distributed network of cloud-based servers, each of which is responsible for hosting a large number of real-time multiplayer games.
6. The game database stores archived information about archived games.
7. The media server cluster is a distributed network of cloud-based servers, each of which is responsible for maintaining a database of archived media (such as video performances).
8. Notification services are used to deliver out-of-game alerts to users.

Fig. 2: Application launch
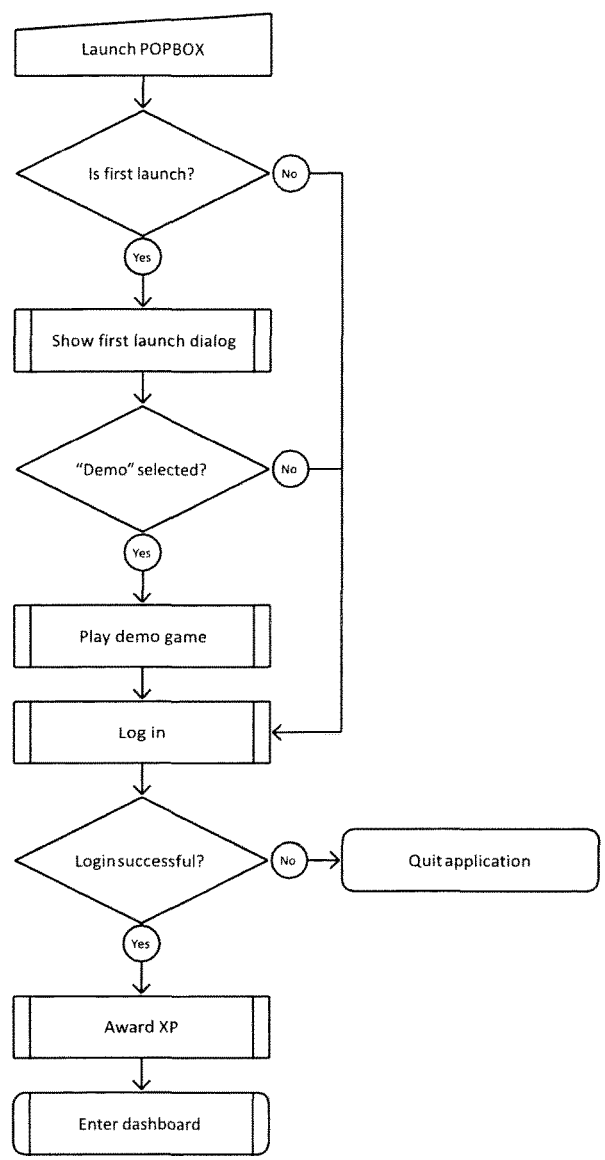

Fig. 3: Login algorithm
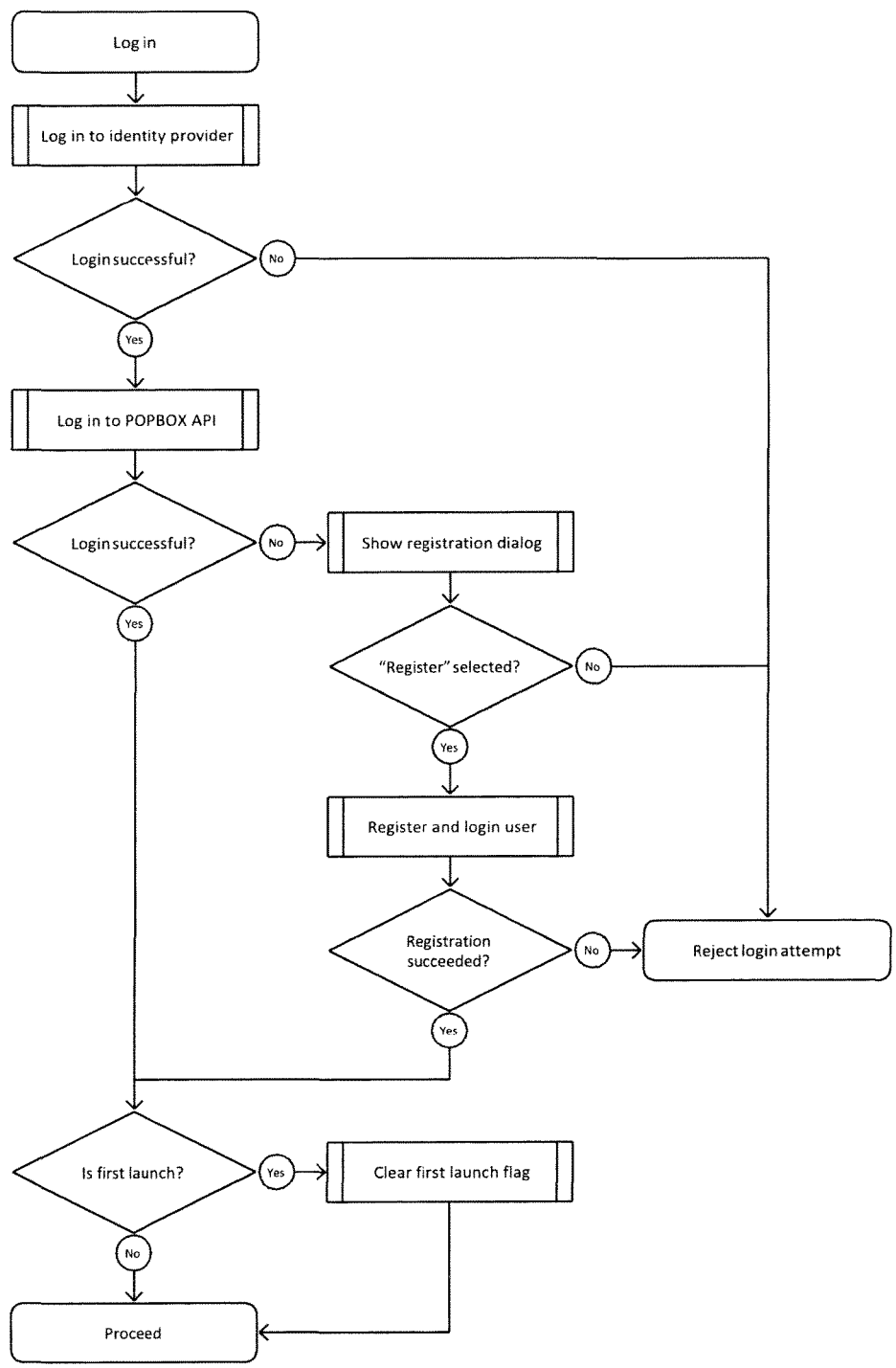

Fig. 4: Identity provider login
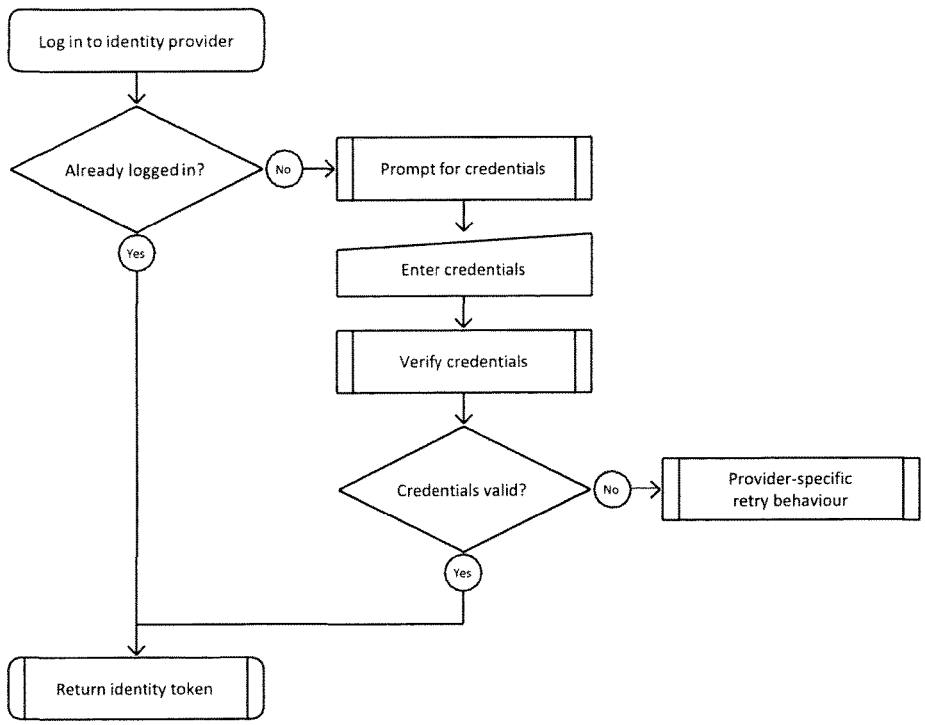
Fig. 5: POPBOX API login
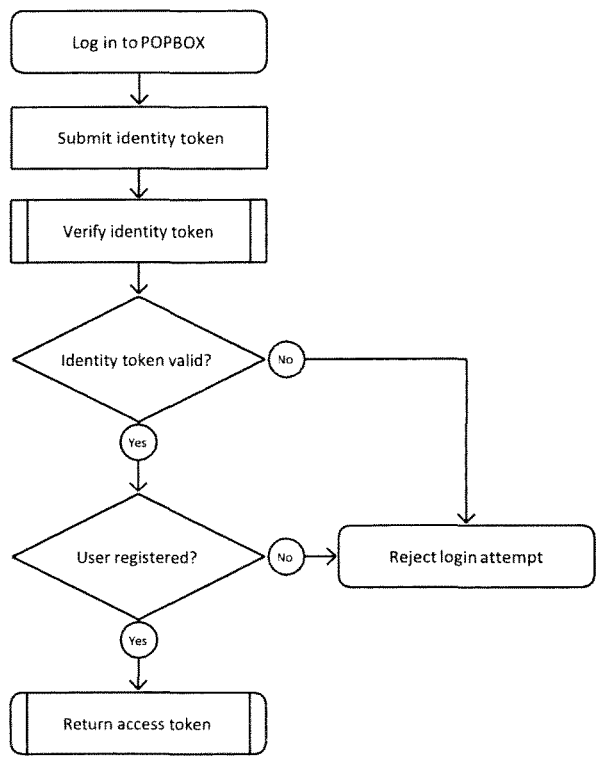

Fig. 6: Registration dialog
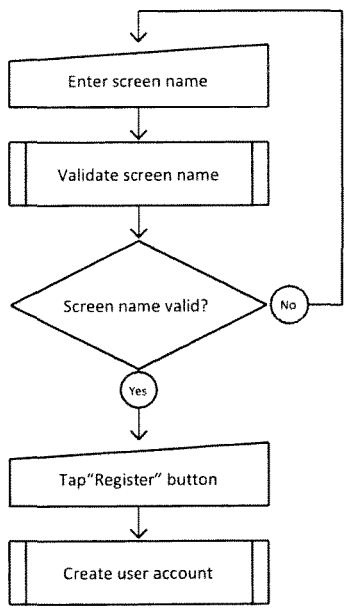
Fig. 7: Dashboard entry
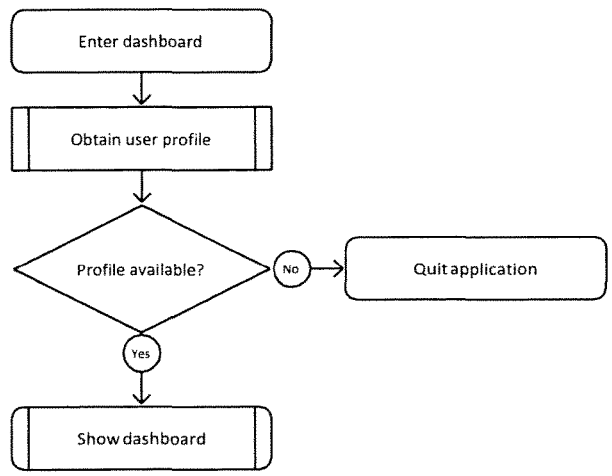

Fig. 8: Dashboard actions
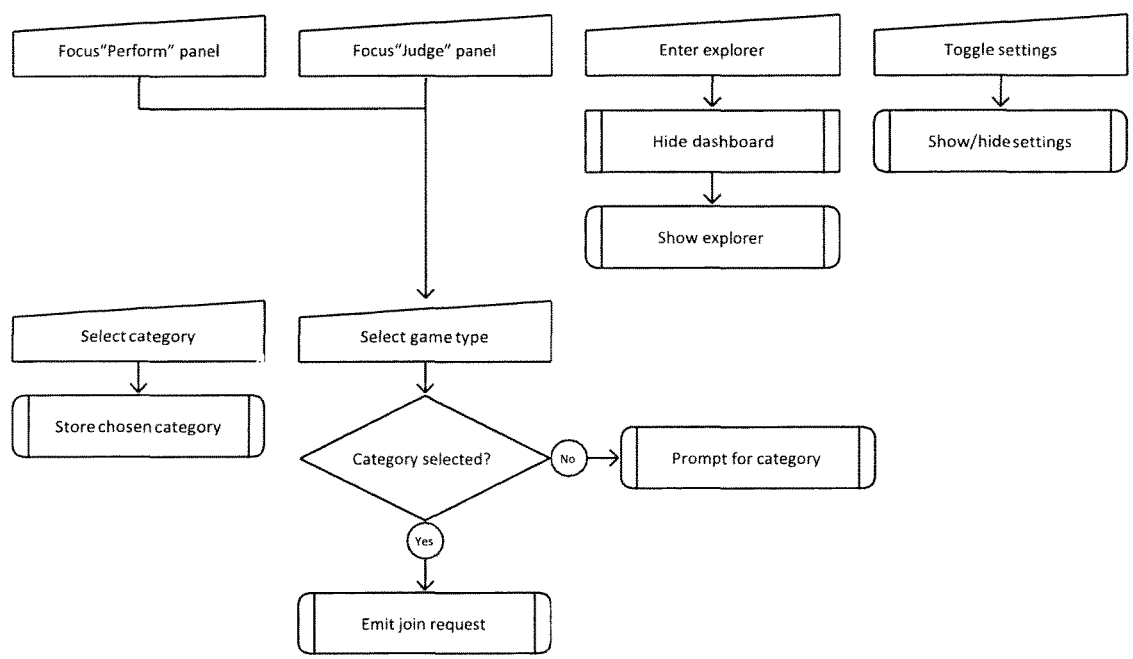

Fig. 9: Join request algorithm
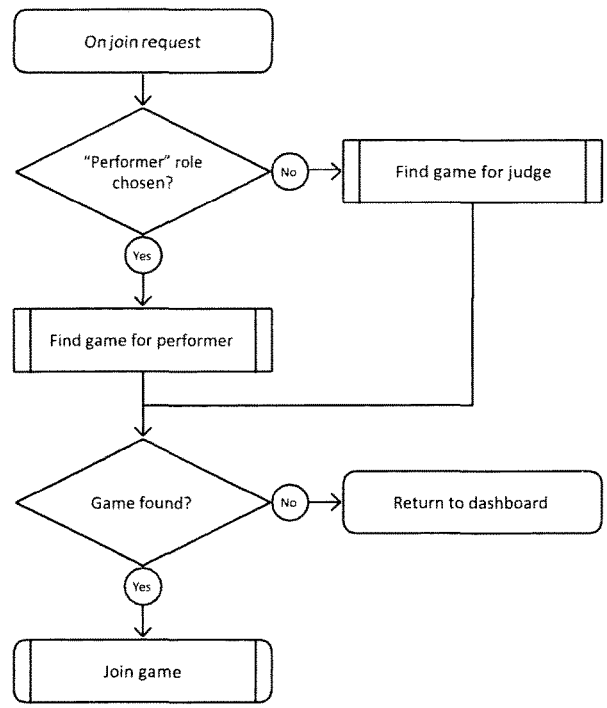
Fig. 10: Matchmaking algorithm (performance games only)
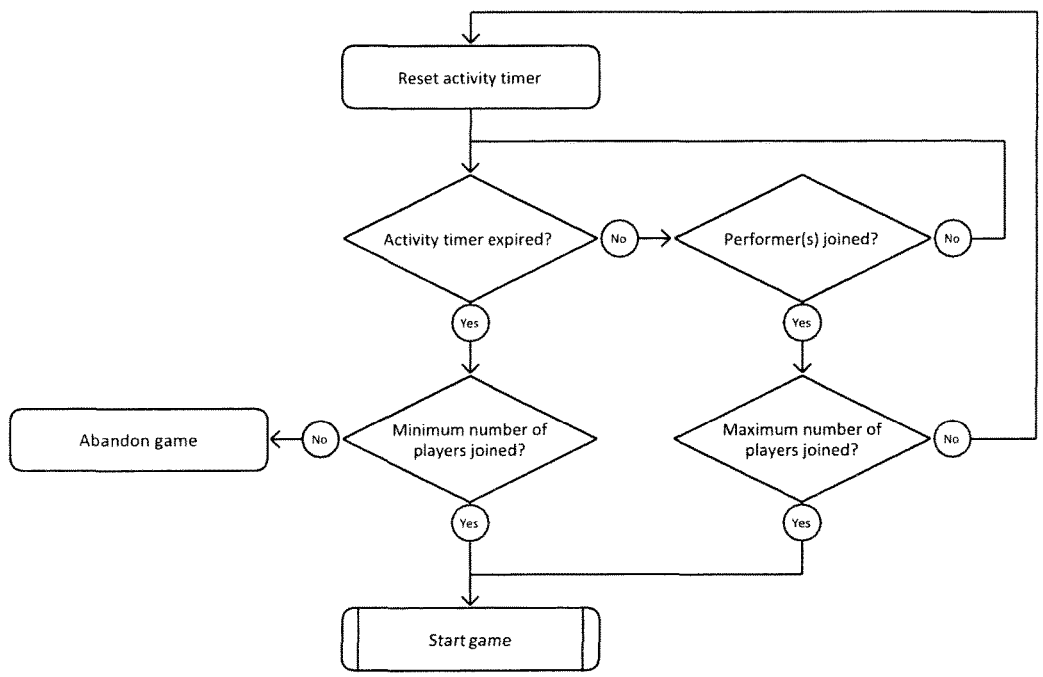

Fig. 11: Performance game search
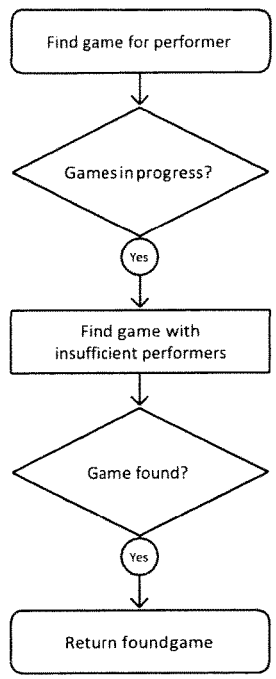
Fig. 12: Judging game search
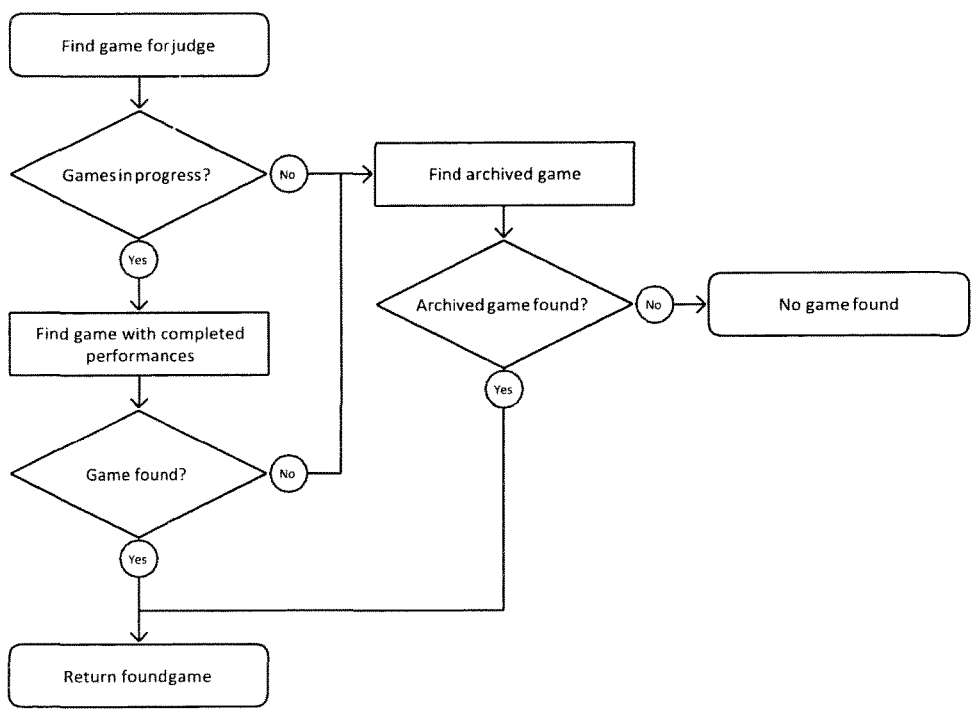

Fig. 13: Classic game overview
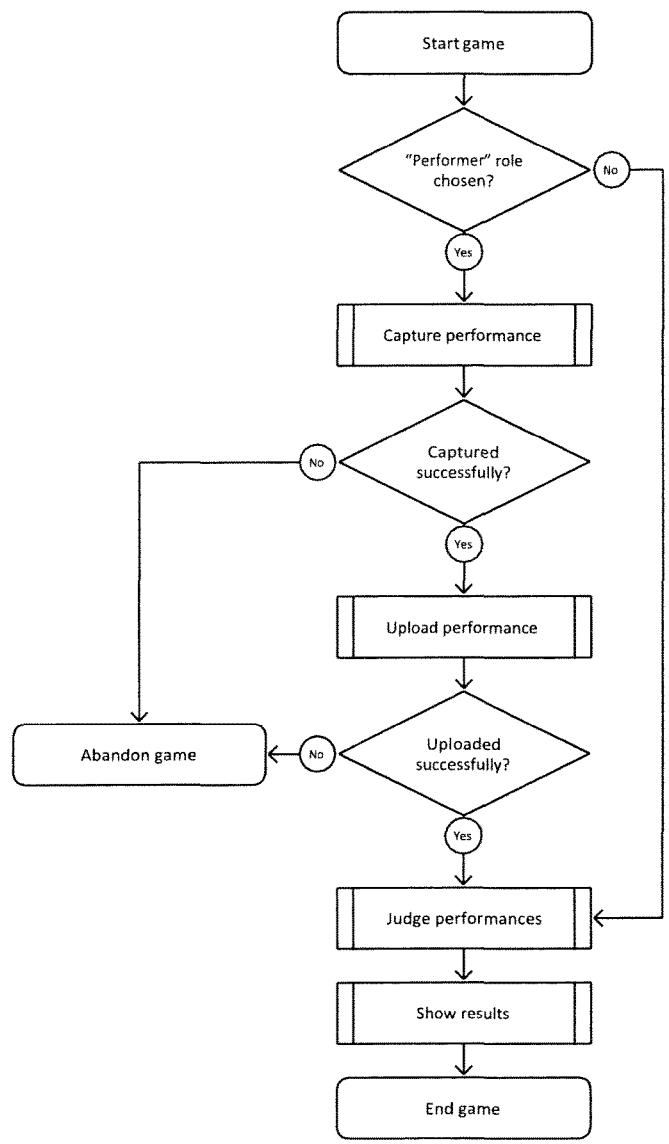

Fig. 14: Live game overview
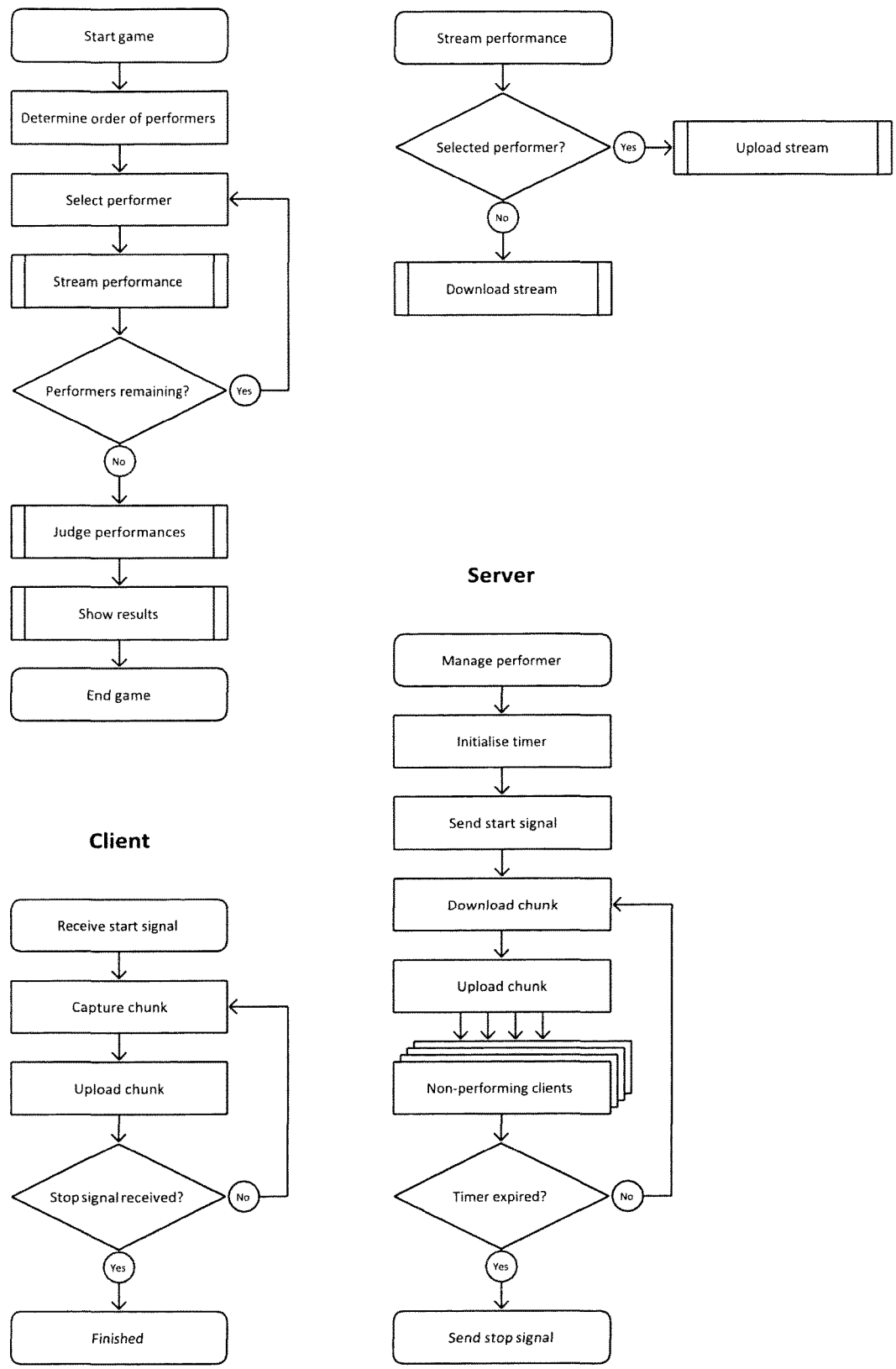

Fig. 15: Duel game overview
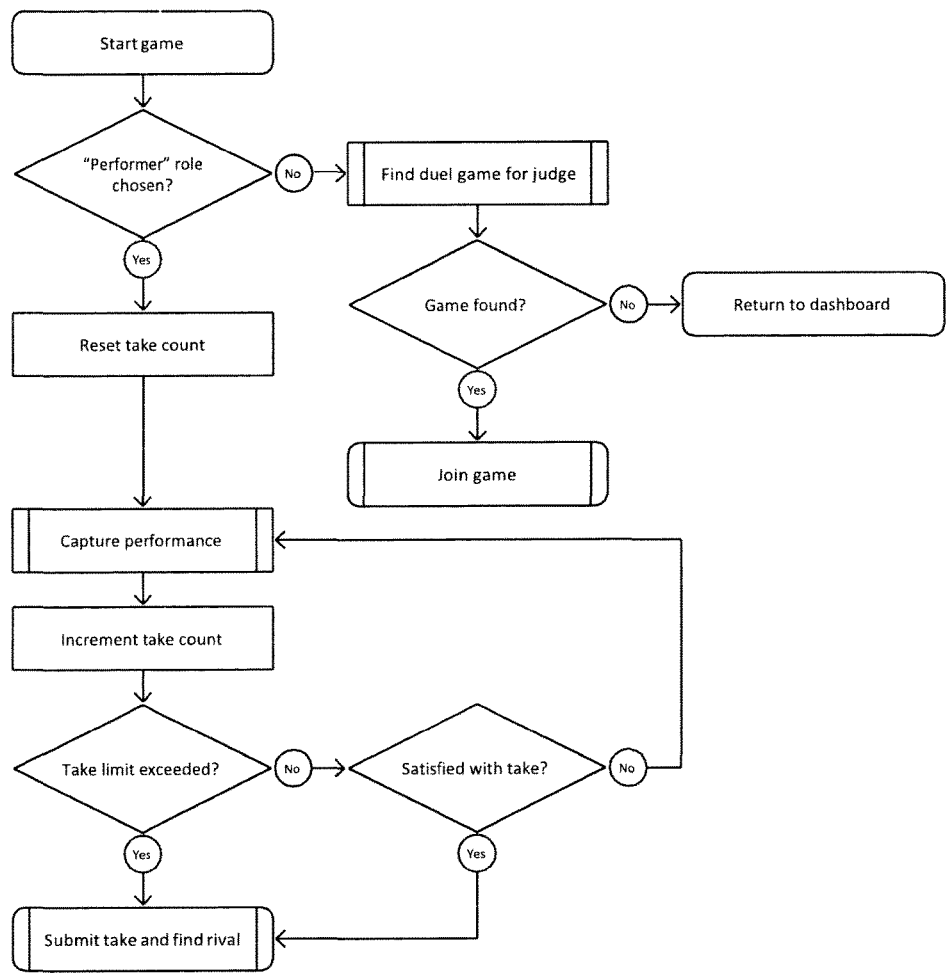

Fig. 16: Challenge game overview
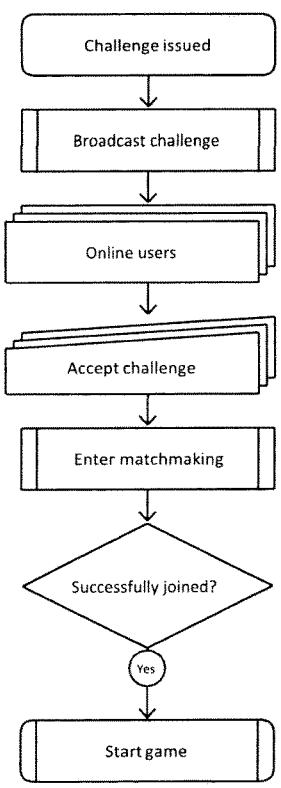

Fig. 17: Performance capture phase
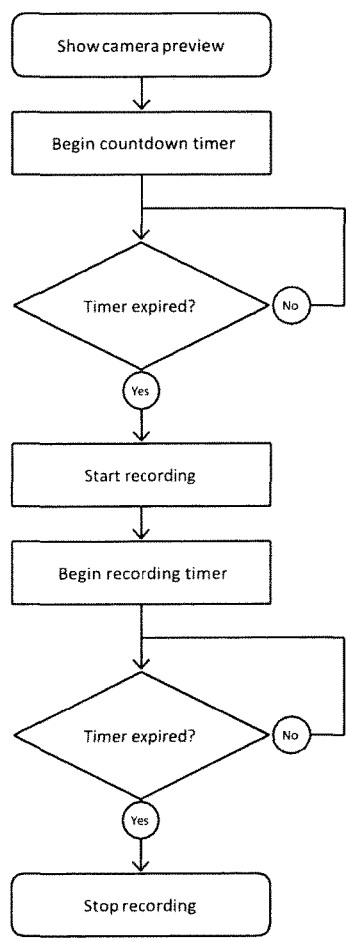

Fig. 18: Performance playback phase
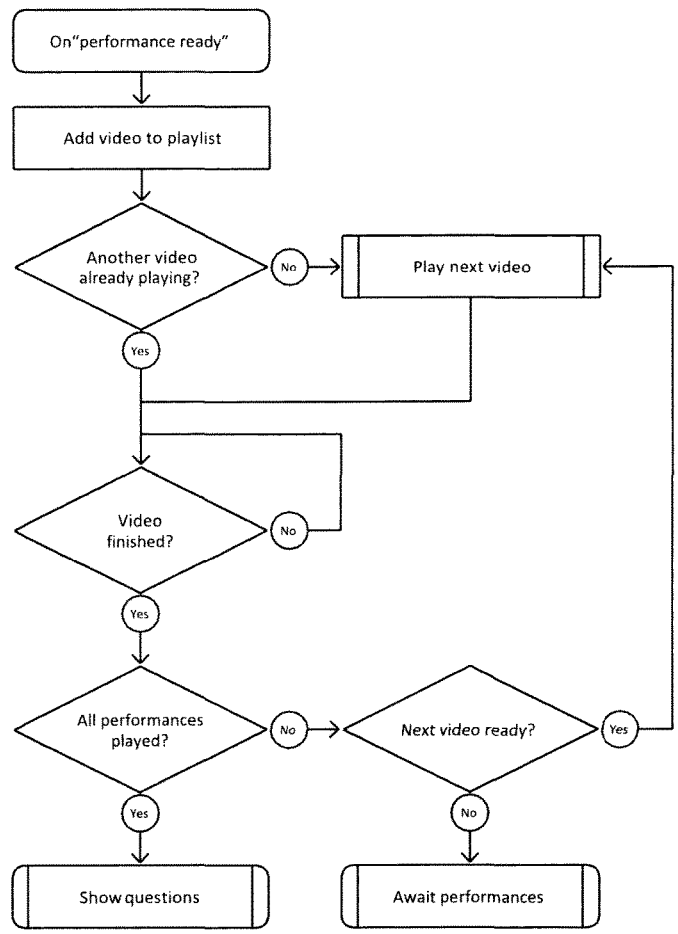

Fig. 19: Judging phase (questions)
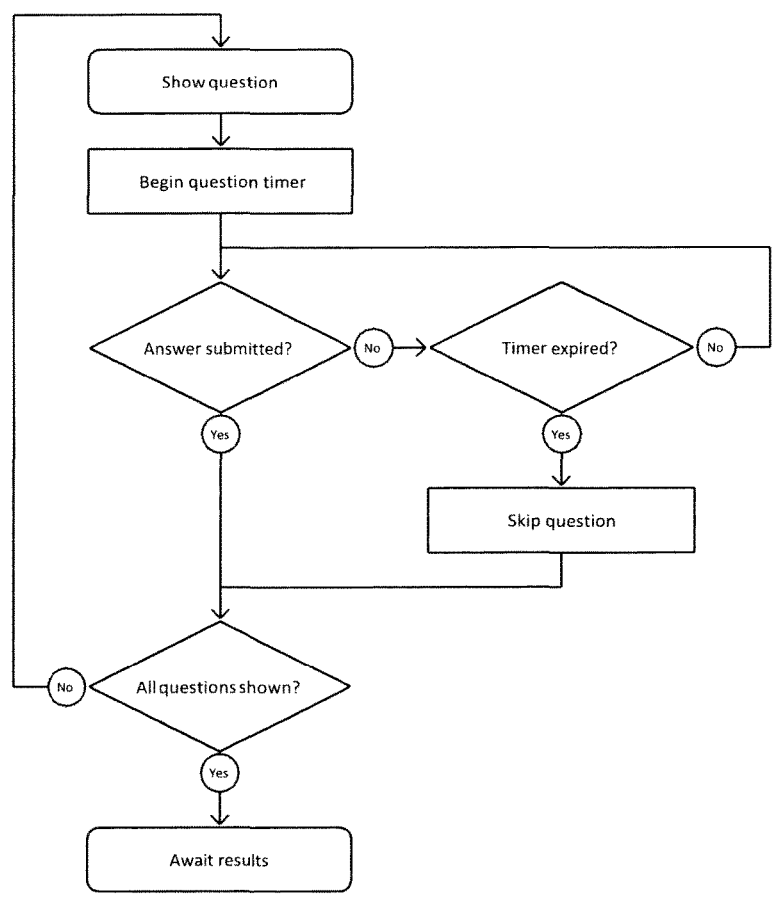

Fig. 20: Performance streaming (client-side)
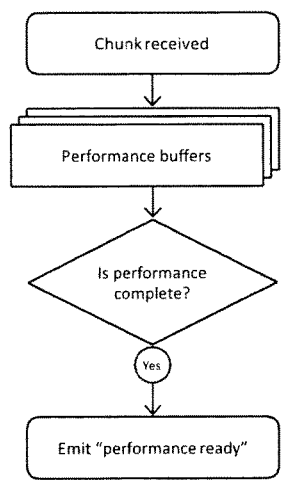
Fig. 21: Offensive content reporting
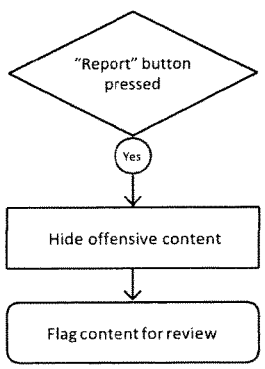

Fig. 22: Performer journey
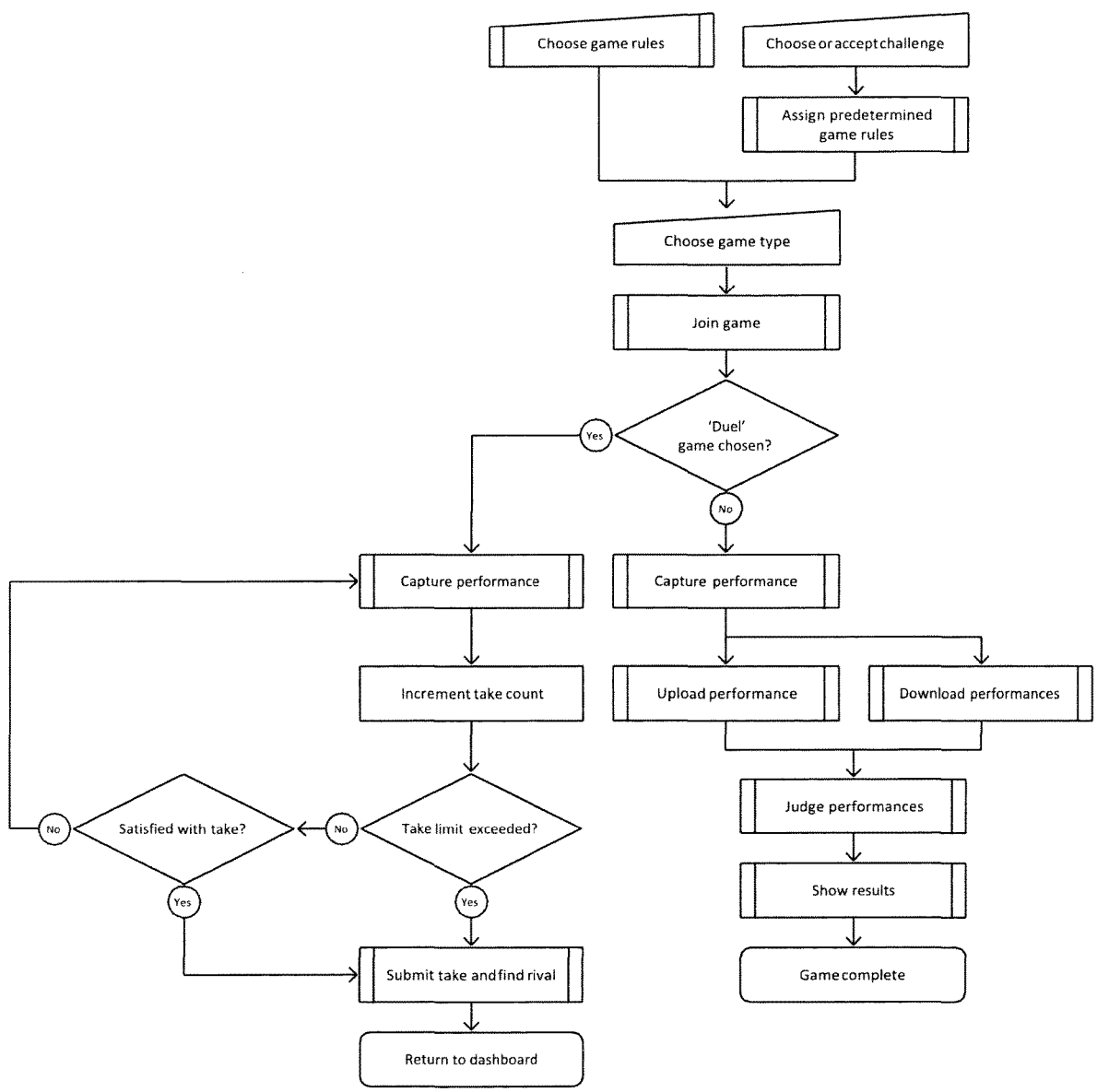

Fig. 23: Judge journey
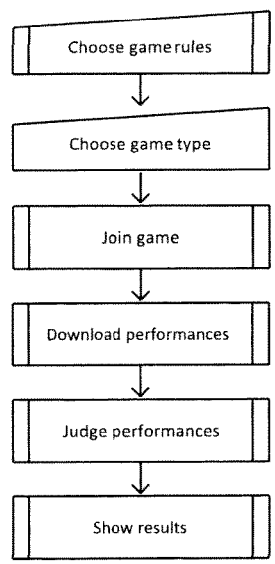
Choose game rules
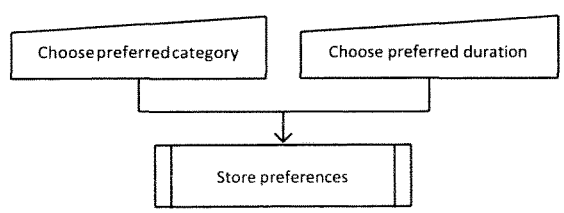

Fig. 24: Game types and connectivity

| Game type | Classic | Live | Duel |
|---|---|---|---|
| Supports public play? | Yes | Yes | Yes |
| Supports private play? | Yes | Yes | Yes |
| Supports local play? | Yes | No | No |

'Public' play
The diagrams throughout this document depict public games (the default behaviour). When a player requests a public game, they are automatically matched with other players connected to the POPBOX platform until sufficient players have been added to the game, at which point play may commence.

'Private' play
Private games are identical to public games except for the matchmaking phase. When a player requests a private game, they are given the option to invite their friends or contacts to join. Private games are only visible to players who have received an invitation from the game's creator. Private games do not contribute scores, awards, rewards, in-game currency or other statistics to competitors' public profiles.

'Local' play
Local games are a special game type enabling multiple players to play a game of POPBOX using a single client device. Only the classic game type supports this mode of operation. In a local game, recording takes place sequentially, rather than concurrently, and there is a separate judging phase for each player. Local games do not contribute scores, awards, rewards, in-game currency or other statistics to competitors' public profiles.

Fig. 25: Example client device
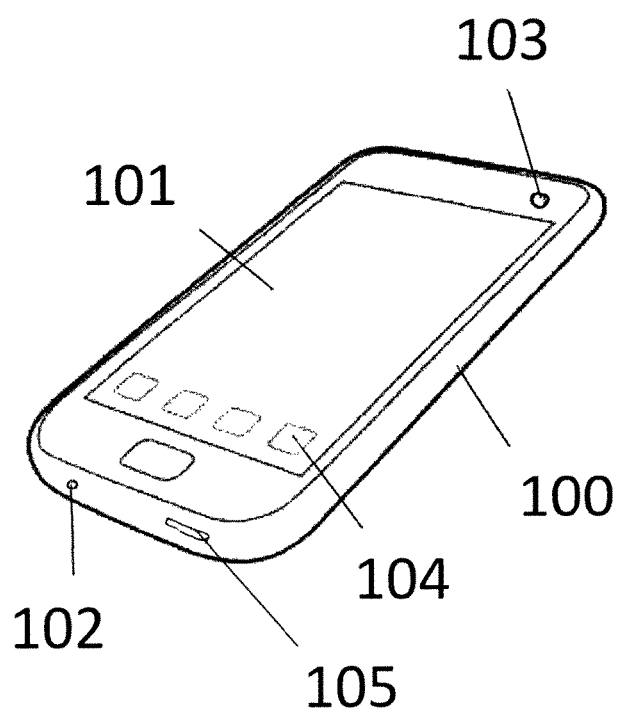

VIDEO SHARING METHOD

Gaming activities have become increasingly popular in part as a result of devices such as iPhone, iPad, Xbox Kinect and PlayStation Move. Interactive capabilities between players of particular games are growing partly due to easy access to high quality video recording via smartphones, Xbox Kinect and PlayStation Eye/Move, among others. Further developments are imminent with the introduction of the Oculus Rift, Sony's Project Morpheus and Microsoft's HoloLens. Demand for new games is high and the social gaming market is experiencing strong growth year on year. There are a rising number of people using games consoles or tablets as their primary source of home entertainment so much so that time spent playing games has now overtaken time spent watching videos, listening to music, and reading magazines. Furthermore, video watching both online via websites like "YouTube" and via the television is well known.

According to the present invention a method of sharing a live video is provided as defined in the appended claims.

The present invention includes an apparatus for sharing a live recording with at least two computers each including or associated with a display and/or an audio output and a video and/or audio recording means, and being connected on a network. The apparatus comprises, determining, by a sharing system, the identity of each player, in a set of at least two players, of at least one game between the at least two players, associating at least one first player having access to a first computer, with at least one second player having access to a second computer and determining a performance time window with a finite duration of time. Also comprising creating a start button on the display of the first computer permitting the at least one first player to select the option to start the performance time window by pressing the start button, starting the recording when the at least first player presses the start button, sending the resulting recorded data relating to the performance to the second computer and receiving of the resulting recorded data relating to the performance by the second computer of the at least one second player sent by the at least one first player using the first computer. Where the recorded data therefore includes a live recording of a first player and the live recording is streamed to the at least one second player, permitting the recording of the first player to be judged by the other at least one second player in the set.

The performance genre may be selected by the at least two players and a performance genre may be allocated to a game. Players could be invited to join, or allocated to, the set until a limited defined number of players is reached and the live recorded performance could be of a predetermined length. The predetermined length may be decided by each player and an indication may be provided to each player that the game is ready to commence once the defined number of players limit is reached.

The players could be given a limited amount of time to start their live performance following the indication that the game has commenced and the at least one second player may select to join at least one game following which the recorded data of the live performances of the at least one game could be streamed to the second computer of the at least one second player. The judging may be carried out by at least one of the at least two players or a non-performing user and points may be awarded to the most accurate judgement by the at least one of the players or the non-performing users, compared to other judgements. There could be a rating system which defines the winner of the game and the rating system could be based on two or more closed questions.

The live recorded data of more than one player may be recorded simultaneously and each player may be given a time limit following the indication that the game has commenced to ensure that they are ready for a simultaneous performance recording. The recorded data could be recorded on the player's computer and could be submitted immediately after it is recorded. The recorded data may be uploaded to a server and the recorded data may be encoded before being sent. The winner of the game could be awarded points or virtual currency and at least two games could be recorded and uploaded simultaneously.

The points awarded in the games could contribute to a leader board of all players. There could be at least three simultaneous recordings and the at least three simultaneous recordings could be ordered into a continuous stream of media to the at least one second player.

The present invention also includes a method for sharing a live recording with at least two computers each including or associated with a display and/or an audio output and a video and/or audio recording means, and being connected on a network. The method comprises, determining, by a sharing system, the identity of each player, in a set of at least two players, of at least one game between the at least two players, associating at least one first player having access to a first computer, with at least one second player having access to a second computer and determining a performance time window with a finite duration of time. Also comprising creating a start button on the display of the first computer permitting the at least one first player to select the option to start the performance time window by pressing the start button, starting the recording when the at least first player presses the start button, sending the resulting recorded data relating to the performance to the second computer and receiving of the resulting recorded data relating to the performance by the second computer of the at least one second player sent by the at least one first player using the first computer. Where the recorded data therefore includes a live recording of a first player and the live recording is streamed to the at least one second player, permitting the recording of the first player to be judged by the other at least one second player in the set.

The method could be carried out by a computer in the form of a computer program.

An embodiment of the invention will now be described in reference to the following drawings in which:

BRIEF DESCRIPTION OF THE DRAWINGS

FIG. 1: Shows a diagram depicting the network infrastructure.

FIG. 2: Shows a flowchart depicting the application launch protocol.

FIG. 3: Shows a flowchart depicting the login algorithm.

FIG. 4: Shows a flowchart depicting the identity provider login protocol.

FIG. 5: Shows a flowchart depicting the API login protocol.

FIG. 6: Shows a flowchart depicting the registration setup protocol.

FIG. 7: Shows a flowchart depicting the dashboard access protocol.

FIG. 8: Shows a flowchart depicting the dashboard actions.

FIG. 9: Shows a flowchart depicting the join request algorithm.

FIG. 10: Shows a flowchart depicting the matchmaking algorithm.

FIG. 11: Shows a flowchart depicting the performance game search protocol.

FIG. 12: Shows a flowchart depicting the judging game search protocol.

FIG. 13: Shows a flowchart depicting the 'classic' game type protocol.

FIG. 14: Shows a flowchart depicting the 'live' game type protocol, including details of the streaming upload protocols on both the server and client device.

FIG. 15: Shows a flowchart depicting the 'duel' game type protocol, from the point of view of the performer.

FIG. 16: Shows a flowchart depicting the 'challenge' game type protocol.

FIG. 17: Shows a flowchart depicting the performance capture protocol.

FIG. 18: Shows a flowchart depicting the performance playback protocol.

FIG. 19: Shows a flowchart depicting the judging phase protocol.

FIG. 20: Shows a flowchart depicting the performance streaming protocol on the client device.

FIG. 21: Shows a flowchart depicting the offensive content reporting protocol.

FIG. 22: Shows a flowchart depicting the high-level user journey for performance games of all types.

FIG. 23: Shows a flowchart depicting the high-level user journey for judging games of all types.

FIG. 24: Shows a table indicating the permitted degrees of connectivity for each game type.

FIG. 25: Shows a perspective view of the client device.

DETAILED DESCRIPTION OF THE EMBODIMENTS

The following refers to FIGS. 1 to 25 and describes a present embodiment of the invention which is in the form of a mobile application game. In the present embodiment, the "user journey" begins by downloading an application program onto a client device. The application program includes game management software, which communicates with the POPBOX platform (FIG. 1).

Referring now specifically to FIG. 2, when a player launches the system by pressing the "Launch POPBOX" icon. The system will then query the client device to determine whether or not this is the first time this client device has launched the system or not. If the system determines that this is the first time the system has been launched on this particular client device, then it will proceed to offer the player the option of playing a "demo" in the "first launch dialog". If this is not the first time this client device has been used to launch the system or if the player selects "No" to play the "demo" or after playing the "demo" the player will be taken to the "log in" screen. If "log in" is successful then the player will be awarded in game points also known as "XP". If the "log in" is not successful then the system will quit the application.

Referring now to FIG. 3, during "log in" the details of the player will be verified by the "identity provider". If this is successful, the system will attempt to "log in to POPBOX API" also known as the API server. If this process is not successful, the player will be taken to the "registration dialog". Here the player will be given the option to register with the system and put in their details to be submitted to allow them to proceed to "log in". If registration is successful, the player is automatically logged in to the system and can continue to play the game.

Referring now to FIGS. 4 and 5, if the player submits their credentials with the "identity provider" and their credentials are confirmed as being valid, the system creates an "identity token". This "identity token" is then read by the server to confirm the identity of the player before inviting the player to register with the system if they have not already done so.

Referring now to FIGS. 6 and 7, here the player is able to set up their registration details. This involves creating a "screen name" which will be how they are publically recognised by other players on the system. The protocol shown in FIG. 6 requires the screen name to be original in order to be successfully validated and allow the player to proceed to "create a user account". This will also allow the player to "obtain a user profile" which is unique to the player and will contain all their player specific system information.

The entire process of registration, identification and participation in the game is automated by the system with no requirement for system or administrative intervention by a human. Once identified, registered and logged in the player is free to select any aspect of the game that they wish to participate in following any of the links located on the "dashboard". These players can freely participate in any aspect of the system, such as performing or judging, without authorisation or interference from a human administrator. Any individual can potentially use the present invention without ever interacting with a human being.

Referring now to FIG. 8, the "dashboard" is where the player is able to select the desired game options. It is also used for navigating through the other features of the system, for example personalising the settings of the system and dashboard, and using the explorer. In the present embodiment the "dashboard" also includes a menu from which the player can select "my profile", "play game" or "explore". Following a selection to "play game" the user is presented with a choice of role, which includes 'performer' and 'judge'. The user may also be presented with the option to choose a game category. Having selected a role (and optional category), the user will then have the option to either participate in a "classic game", a "duel" or a "live" game. Following a successful role, game type and category selection the system will emit a "join request" allowing the player to join a game.

When referring to the recording being "live", the present invention uses the common broadcasting definition for a "live" television or radio broadcast. A "live" broadcast is defined as a broadcast without significant delay and may include an intentional broadcast delay also known in the art as a "profanity delay" or "tape delay".

Referring specifically to a "classic game", this selection consists of three further options: "public game", "private game" and "local game". The "public game" is an important aspect of the present invention; it selects players connected to the internet and logged in to the server, a part of the POPBOX platform (see FIG. 1), using their computing device. The player is first asked to select the genre of game that they would like to play, accept a predetermined genre (a "challenge"), or play in any genre. This selection will determine whether they will be matched with other players competing with the same talent as theirs, or whether they will be allocated to a randomly selected match with no talent preference. An example of a game genre would be singing, alternatively dancing, or other musical or artistic talent. Another example of a genre would be kick-ups or other sporting talent. The player is then asked to select the "game length"; in this embodiment the selections provided to the player are ten, twenty or thirty seconds. This selection determines the length of the video recording in seconds. In the present embodiment the player is then connected to a "matchmaking service". Here the player will be matched with other users, based on genre and game length.

Referring to FIGS. 10 and 11, in order to complete a set of players in a game, which is a minimum of three and a maximum of five in this embodiment, the system uses a matchmaking algorithm shown in FIG. 10. This algorithm uses an "activity timer" to ensure that there is an opportunity for more players to join the game but that the game will still go ahead if the minimum number of players is reached once the time limit expires. Once the timer expires the system starts a game if the minimum number of players have been reached. If the minimum number of players has not been reached, then the system abandons the game. Simultaneously if the maximum number of players is reached the game will start automatically. Furthermore, the timer restarts and the system queries the number of players in the game each time a performer joins the game. In order to connect players who are waiting to find a game with a game that is not yet full to capacity, the system will search for games with insufficient performers and add the performing players to the game.

An indication is provided to the user on their computing device of the number of participants in their group and an indication is provided of the participants joining (and leaving) the group until the group is completed, or the pre-determined time limit has been reached.

Once the maximum number of participants have joined the same game, or the pre-determined time limit has been reached and a minimum number of participants have joined the game, a countdown to begin the video recording starts. In this embodiment the countdown is ten seconds. A clear indication of the countdown is shown to the participants on the computing device they are using. After these ten seconds have passed the participants are simultaneously recorded for a length of time corresponding to the preselected "game length". In this embodiment the recording includes a video and audio recording, which are obtained using the video camera and microphone provided by the participant's device. An indication is shown to the participant that the performance is being recorded, the performance has a time limit, and the recording is happening simultaneously with the other participants' performances.

The video camera and microphone devices on the user's computing device are therefore under the control of the game management software. This application program controls the timing of the video and sound recording and storage on the user computing device.

Referring now to FIGS. 8-20, from the point at which the performer, also known as the player, indicates that they are ready by emitting a join request, to the point at which the player is asked questions during the judgement phase the player begins a fully automated process of video capture, upload, video streaming and review without any further management of the system by either the player or human administrators. Once the player indicates their availability, the system queries the "client device" to determine if a "performer role" has been previously selected by the user. If the player has previously selected to participate in a "performer role" then the system automatically proceeds to the "capture performance" sequence shown in FIG. 17. At this stage the system automatically displays the "camera preview" and begins the "countdown timer". Once the "countdown timer" has expired the system automatically begins recording on the client device so that the video camera and the microphone located in the client device are both turned on automatically. Once the "recording timer" has expired the system automatically stops the recording. If the recording has been successfully captured, the video is encoded according to pre-determined encoding settings and the system proceeds to upload the performance to the server, also known as the game server. Once a recording has been successfully uploaded to the server it is added to a playlist of all the recordings submitted by performing players included in the game. The system then enters the "judge performance" sequence shown in FIGS. 19-21 and 23. To start the judge performance sequence the recordings are streamed to the judging players. The performance players also act as judging players.

In this embodiment the player is provided with a loading screen which advises or indicates to the player to wait for all recordings to be submitted. During this time the videos of each participant are streamed to the other participants, via the POPBOX platform (see FIG. 1). The POPBOX platform also allows the game to be administered and moderated by controlling the flow of data between participants.

All participants are then given a video playback screen which allows the participants to view all the submitted video recordings independently. In the present embodiment, playback of each performance occurs sequentially, prefaced by a visual indication of the subsequent performer's screen name. The order in which the recordings are played is automated by the loop shown in FIG. 18.

After all performances have been played through the game enters the "judgement phase" shown in FIG. 19. Thumbnails of the performances are then shown. The participants are presented with a series of closed questions. In this embodiment there are two standard questions: "Who did you find most entertaining?" and "Who do you think will win?" for which the answers are submitted by tapping the corresponding thumbnail. The third question is randomly selected from a pre-determined list, and answered in the same way as the standard questions. The fourth question is also closed, but does not relate to the performances. Instead, the participants are presented with a selection of possible answers and select one by tapping it. The two standard questions are designed to offset any bias of preferential opinion.

In the present embodiment, the winner or winners are decided based on the answers that the participants give to one or more of these questions. The participants cannot vote for themselves. At this time the non-performing users are also invited to judge the performances and are selected through the "judge" aspect of the game. The participants and the non-performing users are given a limited amount of time to answer each question. In the present embodiment this time is ten seconds per question. The results of the voting are displayed. Experience points and in-game currency are awarded to all players, the winner and the participating non-performing users. The winning amount is split if it is a tie. The amount of in-game currency and experience points that are awarded is proportionate to the players ranking in the performance and also to the accuracy of their vote. Each player's ranking is determined by the result of the vote, and the accuracy of each player's vote is determined by the number of similar votes by other players.

The system can manage demand for games between judges and performers by changing the in-game currency and experience points awarded for judging or performing particular games.

The player is then given the option to save their performance or not. The player is restricted to the number of performances they can store; in this embodiment the maximum number of videos that can be stored is three. This storage feature is an aspect of the game that can have its limit increased with the exchange of in-game currency.

The player is then prompted to either "play again" or go back to their "dashboard". In this embodiment, all videos will be stored on the system for 48 hours for the purposes of moderation, auditing and providing archived judging games in the event that no live games are available, but can appear to be deleted to the user.

Referring specifically to FIG. 23, the "judge" selection will lead to an aspect of the game where players are required only to judge other performing players (participants) based on the other players' performance merit. Participants in this game make up the observing non-performing users in the classic, duel and live games. Within the "judge" aspect of the game, players are given the option to judge one of the aforementioned game types. In all game options the player is asked to select the "game length" that they wish to judge. The judging player is given the same video playback screen as the performing players. Once the videos have been watched, the judging player has to go through the same questioning and voting system as the performing participants. The judging player is awarded with in-game currency and experience points for how accurately they answered the questions compared to the answers provided by the performing players. In this embodiment the votes cast by the judging players do not determine the winners of the games; only the performing players can determine the outcome. Non-performing votes can grant rewards to performing players.

If the player selects a "private game" in the "classic game" menu, they are taken to an alternative game format. Here the game is identical to the "public game" apart from the selection process of fellow participants. In a "private game" one participant acts as the host, and selects the other participants from a list of available players. In this embodiment, the list will consist of that participant's "Friends" rather than randomly selected from the public players. In this game there is also no observation from non-performing users. Furthermore, there are no in-game currency or experience point awards.

The "local" game, as shown in FIG. 24, is equivalent to a "private game", however all the participants operate from a single computing device. In this aspect, all players participate in the game locally and perform consecutively as opposed to simultaneously.

FIGS. 14 and 15 depict alternative game types to the multiplayer game type discussed above. FIG. 15 shows the duel game type. Here the player has multiple but finite attempts at making a recording referred to in FIG. 15 as "takes". Following the recording the system reduces the number of remaining attempts by one and then queries how many attempts remain. If there are no remaining attempts the recording is submitted. However, if there are one or more attempts remaining the player is given the choice of whether they would like to have another attempt. If the player is satisfied with their attempt they may submit the recording with attempts remaining. The duel game may only include two players however there can be at least one judging player included in the game.

In the "duel" option of the "judge" game aspect, the judging player is given two selected videos, based on predetermined criteria and user options, from the submissions in the "duel database". The judging player is invited to watch each video. The judging player is again asked to vote on the two videos based on at least one question.

FIG. 16 shows a challenge game, where a player requests a challenge, or responds to a challenge issued by another player, or by the POPBOX platform. A challenge game plays like any other game—duel, classic or live—except that the rules of the game (duration, category, etc.) are determined automatically by the POPBOX platform and not the players themselves. The standard questions are replaced with challenge-specific questions.

Referring specifically to FIG. 21, there is also included a "reporting" feature in the present embodiment. This allows players to hide content which they find offensive and also report content to the administrators of the system for review.

FIG. 25 shows the client device also known as the computer 100 of the present embodiment. In this embodiment the client device 100 includes the display 101, the recording equipment 103 and 102, the speaker 105 and the start button 104. The display 101 can be used to view the performance along with the audio via a speaker 105. In this embodiment, the recording equipment includes a camera 103 and a microphone 102 for capturing the video and audio for the recording of the performer. The start button 104 can be used to launch the system on the client device and to begin the recording of the performance.

Referring now to FIGS. 8-11, 13, 14, 17-20, 22 and 23 from the point at which the performer, also known as the player, indicates which type/category of game they would like to play to the point at which the player is asked two questions during the judgement phase the process is entirely automated by the system. The player indicates that they are ready by pressing an onscreen button labelled "Start Game", as shown in FIG. 13. Once this button has been pressed the player begins a fully automated process of video capture, upload, video streaming and review without any further management of the system by either the player or human administrators. Once the player indicates their availability by selecting "Start Game", the system, queries the "client device" to determine if a "performer role" has been previously selected by the user. If the player has previously selected to participate in a "performer role" then the system automatically proceeds to the "capture performance" sequence shown in FIG. 17. At this stage the system automatically displays the "camera preview" and begins the "countdown timer". Once the "countdown timer" has expired the system automatically begins recording on the client device so that the video camera and the microphone located in the client device are both turned on automatically. Once the "recording timer" has expired the system automatically stops the recording. If the recording has been successfully captured the system proceeds to upload the performance to the server also known as the game server. Once the recording has uploaded successfully the system then enters the "judge performance" sequence shown in FIG. 23. To start the judge performance sequence the recordings are streamed to the judging players. Once a recording has been successfully uploaded to the server it is added to a playlist of all the recordings submitted by performing players included in the game. Once all the recordings of that game have been uploaded on to the server the system then automatically streams the uploaded recordings back to the players also. The performance players also act as judging players.

The order in which the recordings are played is automated by the feedback loop shown in FIG. 18. Once all the recordings have been played the game enters the "judgement phase" shown in FIG. 19 where the judging players are invited to answer at least one question in order to determine the winner of the game. This stage requires the player to select their answer to a pre-defined question presentation and submission of the answer is all automated by the system.

Referring now to FIGS. 12, 18, 19, 20 and 23 a player who only wants to be included in the "judgement phase" of the game, only has to indicate their availability for participating in the game and remain available for the duration of the "judgement phase". The selection of the players, the automatic inclusion of these players into a pre-existing performance game and the streaming of the uploaded recordings to the judging players is all automated by the system. Once the player has indicated that they would like to join a game by pressing the "join request" button, the system automatically queries the client device to determine that the player is not a performer but a judge. The system then determines whether or not there is a game currently in progress. If there is a game in progress the system automatically selects the game which has completed the performance phase of the game and automatically includes the player into the "judgement phase" of the game. From this point on all players included in the game by the system follow the same streaming protocol for issuing the playlist of recordings.

Referring to FIGS. 1-25, the entire process of registration, identification and participation in the game is automated by the system with no requirement for system or administrative intervention by a human. Once the player has submitted their details for registration the system automatically verifies these credentials following the "identity provider login". Once identified, registered and logged in the player is free to select any aspect of the game that they wish to participate in following any of the links located on the "dashboard". These players can freely participate in any aspect of the system, such as performing or judging, without authorisation or interference with a human administrator. Any individual can potentially use the present invention without ever interacting with a human being.

The invention claimed is:

1. An apparatus for sharing a live recording with at least two computers each including or associated with a display and/or an audio output and a video and/or audio recording means, and being connected on a network, the apparatus comprising:
   determining, by a sharing system, the identity of each player, in a set of at least two players, of at least one game between the at least two players;
   associating at least one first player having access to a first computer, with at least one second player having access to a second computer;
   determining a performance time window with a finite duration of time before a recording is started;
   creating a start button on the display of the first computer permitting the at least one first player to select the option to start the performance time window by pressing the start button;
   starting the recording when the at least first player presses the start button;
   sending the resulting recorded data relating to the performance to the second computer;
   receiving of the resulting recorded data relating to the performance by the second computer of the at least one second player sent by the at least one first player using the first computer;
   wherein the recorded data therefore includes a live recording of a first player;
   and wherein the live recording is streamed to the at least one second player, and there is included a rating system which defines the winner of the game, wherein the at least one second user is presented by the second computer with one or more questions relating to the resulting recorded data permitting the recording of the first player to be judged by the other at least one second player in the set, the elicited responses input into the second computer are utilised by the rating system to determine the winner.

2. The apparatus of claim 1, wherein a performance genre is selected by the at least two players.

3. The apparatus of claim 1, wherein a performance genre is allocated to a game.

4. The apparatus of claim 1, wherein players are invited to join, or allocated to, the set until a limited defined number of players is reached.

5. The apparatus of claim 1, wherein the live recorded performance is of a predetermined length.

6. The apparatus of claim 1, wherein the predetermined length is decided by each player.

7. The apparatus of claim 4, wherein an indication is provided to each player that the game is ready to commence once the defined number of players limit is reached.

8. The apparatus of claim 7, wherein the players are given a limited amount of time to start their live performance following the indication that the game has commenced.

9. The apparatus of claim 1, wherein the at least one second player may select to join at least one game following which the recorded data of the live performances of the at least one game are streamed to the second computer of the at least one second player.

10. The apparatus of claim 1, wherein the judging is carried out by at least one of the at least two players or a non-performing user.

11. The apparatus of claim 10, wherein points are awarded to the most accurate judgement by the at least one of the players or the non-performing users, compared to other judgements.

12. The apparatus of claim 1, wherein there is a rating system which defines the winner of the game and is based on two or more closed questions.

13. The apparatus of claim 1, wherein the live recorded data of more than one player are recorded simultaneously.

14. The apparatus of claim 7, wherein each player is given a time limit following the indication that the game has commenced to ensure that they are ready for a simultaneous performance recording.

15. The apparatus of claim 13, wherein the recorded data is recorded on the player's computer and is submitted immediately after it is recorded.

16. The apparatus of claim 15, wherein the recorded data is uploaded to a server.

17. The apparatus of claim 1, wherein the recorded data is encoded before being sent.

18. The apparatus of claim 12, wherein the winner of the game is awarded points or virtual currency.

19. An apparatus for sharing a live recording with at least two computers each including or associated with a display and/or an audio output and a video and/or audio recording means, and being connected on a network, the apparatus comprising:
   determining, by a sharing system, the identity of each player, in a set of at least two players, of at least one game between the at least two players;
   associating at least one first player having access to a first computer, with at least one second player having access to a second computer;
   determining a performance time window with a finite duration of time;

creating a start button on the display of the first computer permitting the at least one first player to select the option to start the performance time window by pressing the start button;
starting the recording when the at least first player presses the start button;
sending the resulting recorded data relating to the performance to the second computer;
receiving of the resulting recorded data relating to the performance by the second computer of the at least one second player sent by the at least one first player using the first computer;
wherein the recorded data therefore includes a live recording of a first player;
wherein the live recording is streamed to the at least one second player, permitting the recording of the first player to be judged by the other at least one second player in the set; and
wherein at least two games can be recorded and uploaded simultaneously.

20. The apparatus of claim 11, wherein the points awarded in the games contribute to a leader board of all players.

21. The apparatus of claim 13, wherein there are at least three simultaneous recordings.

22. The apparatus of claim 12, wherein the at least three simultaneous recordings are ordered into a continuous stream of media to the at least one second player.

23. A method for sharing a live recording with at least two computers each including or associated with a display and/or an audio output and a video and/or audio recording means, and being connected on a network, the apparatus comprising:
determining, by a sharing system, the identity of each player, in a set of at least two players, of at least one game between the at least two players;
associating at least one first player having access to a first computer, with at least one second player having access to a second computer;
determining a performance time window with a finite duration of time;
creating a start button on the display of the first computer permitting the at least one first player to select the option to start the performance time window by pressing the start button;
starting the recording when the at least first player presses the start button;
sending the resulting recorded data relating to the performance to the second computer;
receiving of the resulting recorded data relating to the performance by the second computer of the at least one second player sent by the at least one first player using the first computer;
wherein the recorded data therefore includes a live recording of a first player;
and wherein the live recording is streamed to the at least one second player, and there is included a rating system which defines the winner of the game, wherein the at least one second user is presented by the second computer with one or more questions relating to the resulting recorded data permitting the recording of the first player to be judged by the other at least one second player in the set, the elicited responses input into the second computer are utilised by the rating system to determine the winner.

24. A method according to claim 23, wherein the method can be carried out by a computer in the form of a computer program.

\* \* \* \* \*